(12) United States Patent  
Strong et al.

(10) Patent No.: US 8,717,693 B2  
(45) Date of Patent: *May 6, 2014

(54) MOVABLE LENS ASSEMBLY AND ASSOCIATED METHODS

(71) Applicant: Lensbaby, LLC, Portland, OR (US)

(72) Inventors: Craig C. Strong, Portland, OR (US); Samuel Pardue, Portland, OR (US); William McDonough, Portland, OR (US)

(73) Assignee: Lensbaby, LLC, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 13/847,431

(22) Filed: Mar. 19, 2013

(65) Prior Publication Data

US 2013/0208368 A1 Aug. 15, 2013

Related U.S. Application Data

(62) Division of application No. 12/811,447, filed as application No. PCT/US2008/088681 on Dec. 21, 2008, now Pat. No. 8,400,724.

(60) Provisional application No. 61/099,104, filed on Sep. 22, 2008, provisional application No. 61/019,211, filed on Jan. 4, 2008.

(51) Int. Cl.  
*G02B 7/02* (2006.01)

(52) U.S. Cl.  
USPC .......................... 359/823; 359/829; 359/830

(58) Field of Classification Search  
USPC ................... 359/694–704, 811–830; 396/529  
See application file for complete search history.

(56) References Cited

U.S. PATENT DOCUMENTS

| 4,251,134 | A | | 2/1981 | Sato et al. |
| 4,281,916 | A | | 8/1981 | Aoyagi |
| 4,299,470 | A | * | 11/1981 | Shimizu ........................ 396/529 |
| 5,592,331 | A | | 1/1997 | Eastcott |
| 8,400,724 | B2 | * | 3/2013 | Strong et al. .................. 359/823 |
| 2007/0024740 | A1 | | 2/2007 | Strong |

OTHER PUBLICATIONS

International Search Report dated Feb. 19, 2009, corresponding to International Patent Application No. PCT/US2008/088681.

* cited by examiner

*Primary Examiner* — Mohammed Hasan  
(74) *Attorney, Agent, or Firm* — Marger Johnson & McCollom PC (57) ABSTRACT

The described lens assembly for use with a camera having a camera body includes a tilt assembly portion configured to allow pivotal movement of the lens body relative to the camera body. The lens assembly further includes a focus assembly configured to axially adjust a position of a removable optic assembly mounted to the focus assembly relative to the lens body to control focus of the lens assembly when the optic assembly is installed in the lens body. The lens body and focus assembly may be structured to remain coupled to the camera body after the optic assembly is removed from the focus assembly.

11 Claims, 10 Drawing Sheets

MOVABLE LENS ASSEMBLY AND ASSOCIATED METHODS

CROSS REFERENCE TO RELATED APPLICATION

This application is a division of U.S. patent application Ser. No. 12/811,447, filed Oct. 7, 2010, now U.S. Pat. No. 8,400,724 B2 which was a national stage of International Patent Application PCTUS2008/088681 filed Dec. 21, 2008, which claimed benefit of U.S. Provisional Patent Application No. 61/099,104 filed Sep. 22, 2008, and of U.S. Provisional Patent Application No. 61/019,211 filed Jan. 4, 2008, all of which are incorporated herein in their entireties by reference thereto.

TECHNICAL FIELD

The present disclosure generally relates to movable lens assemblies associated with photography.

BRIEF DESCRIPTION OF THE FIGURES

FIG. 2A is an isometric exploded front view, FIG. 2B is an isometric exploded rear view.

DETAILED DESCRIPTION

The following disclosure describes several embodiments of lens assemblies and associated methods. Certain details are set forth in the following description and in FIGS. 1A-7 to provide a thorough understanding of various embodiments of the disclosure. Other details describing well-known structures and components often associated with lens assemblies, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Various embodiments of the disclosure can include structures other than those illustrated in the Figures and are expressly not limited to the structures shown in the Figures.

Figure 1A:
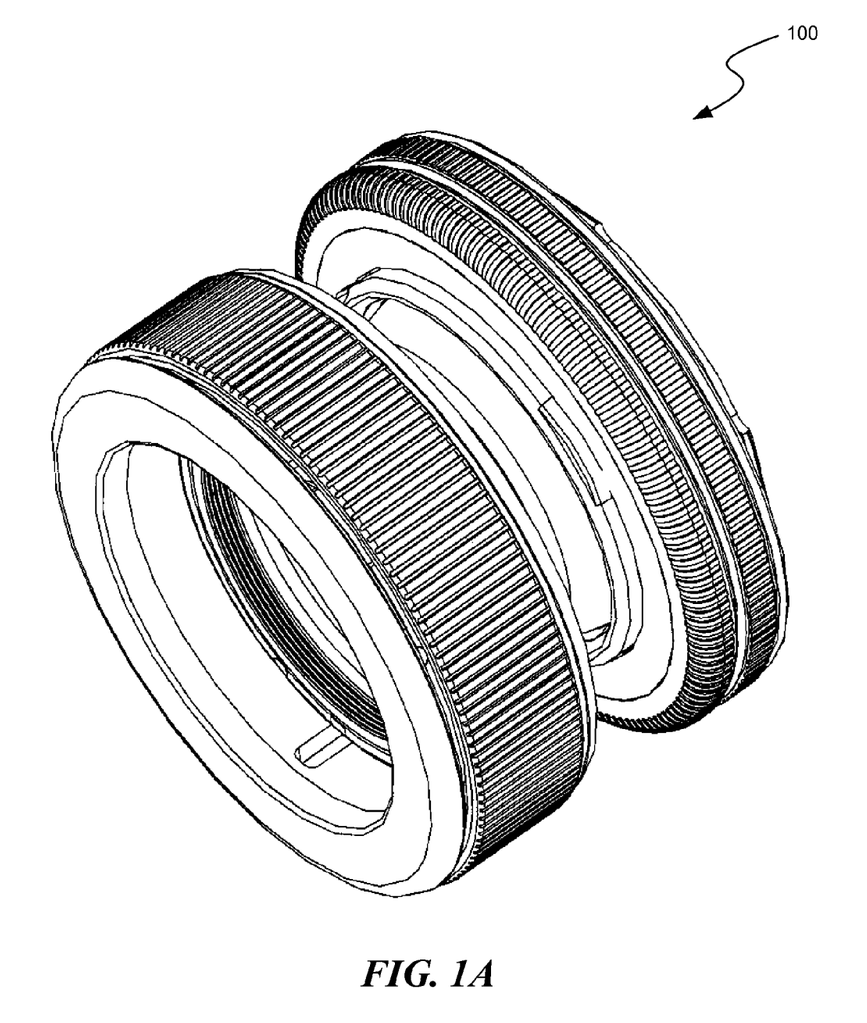
FIG. 1A is an isometric front view and FIG. 1B is a side view of a lens assembly configured in accordance with an embodiment of the disclosure.
Figure 1B:
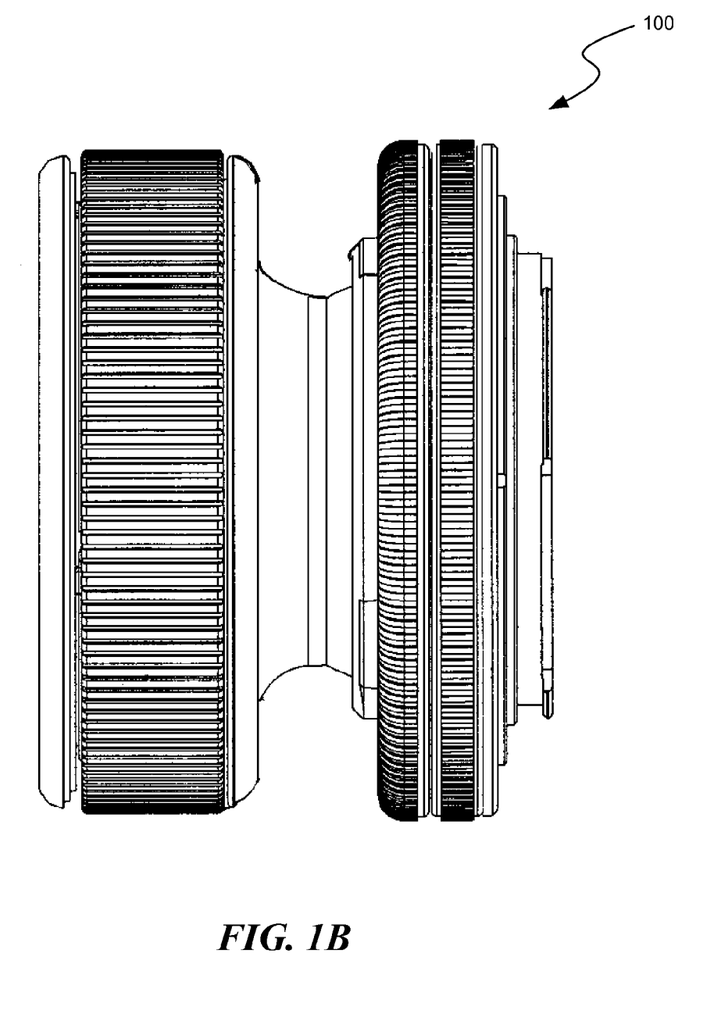

FIG. 1A is a isometric front view and FIG. 1B is a side view of a lens assembly 100 configured in accordance with an embodiment of the disclosure. The lens assembly 100 generally includes a ball in socket based tilt lens ("BSBTL") that provides a means by which photographers are able to easily create unique, selective focus imagery previously associated with cumbersome to use tilt/shift lenses and view cameras. The BSBTL is a focus and tilt lens system that allows lenses to be tilted off-parallel related to the image plane. The BSBTL replaces the cumbersome adjustments of a tilt/shift lens and view cameras with a natural, simple and intuitive system for moving a lens off parallel from the image plane. Several subassemblies and components of the lens assembly, including the BSBTL, are described below in more detail with reference to FIGS. 2A-2C.

Figure 2A:
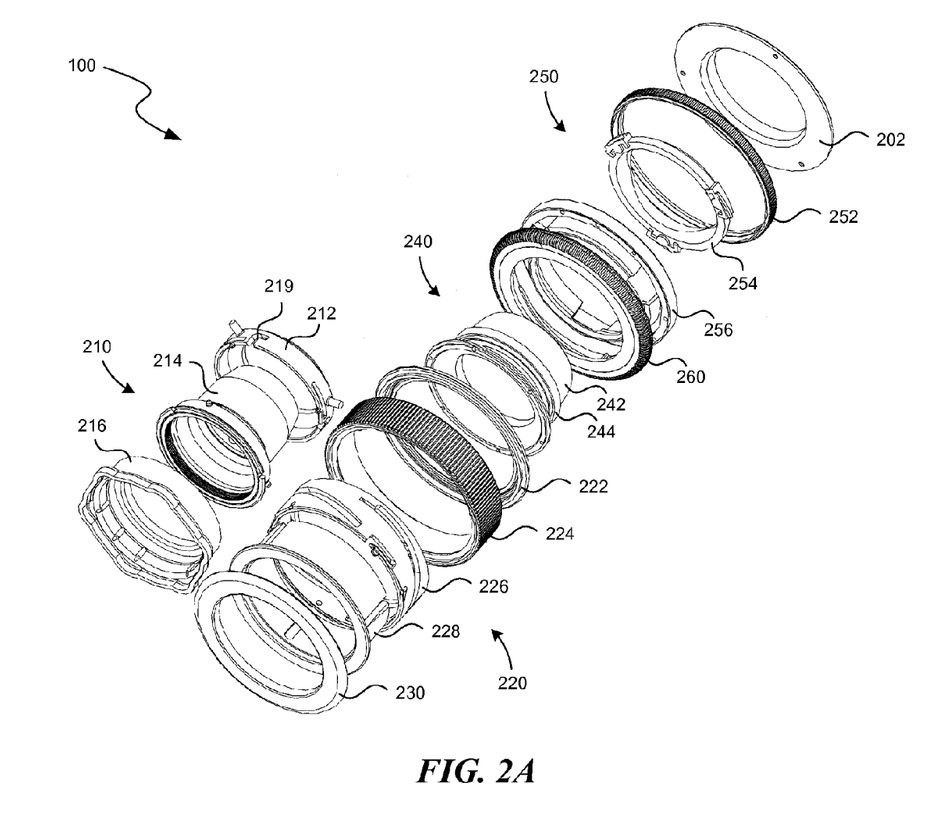
Figure 2B:
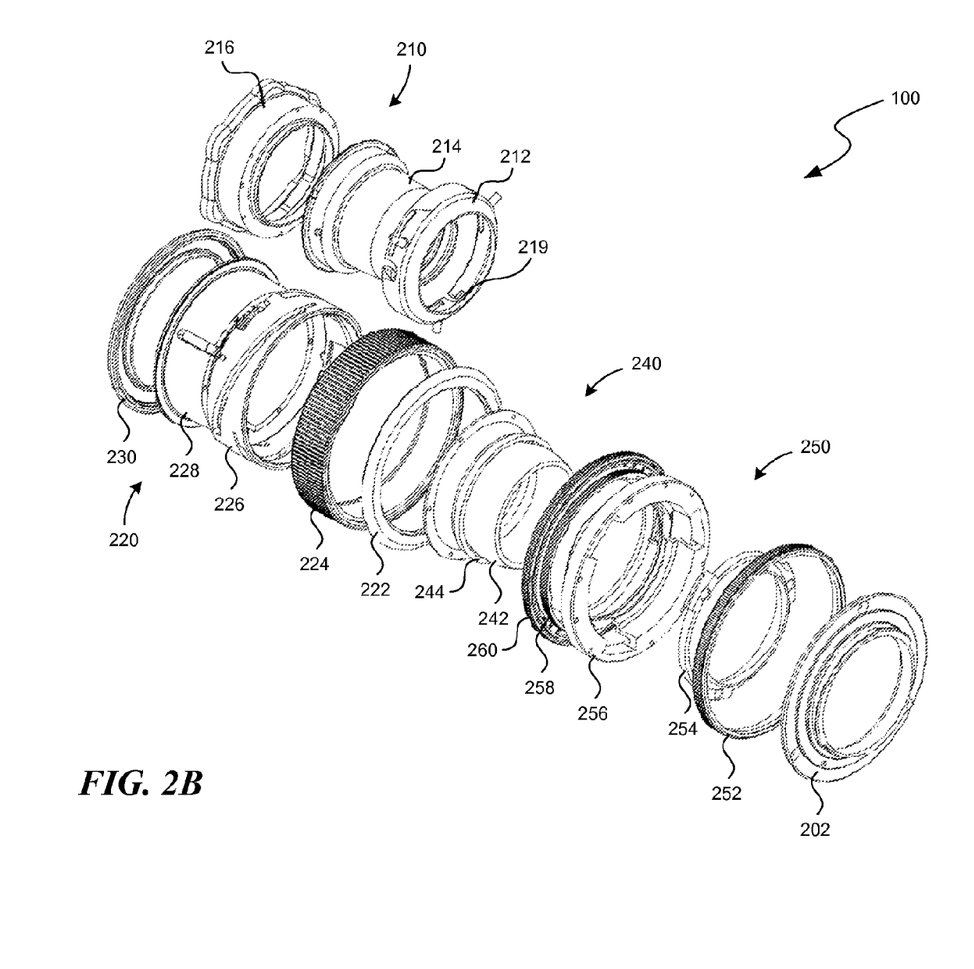
Figure 2C:
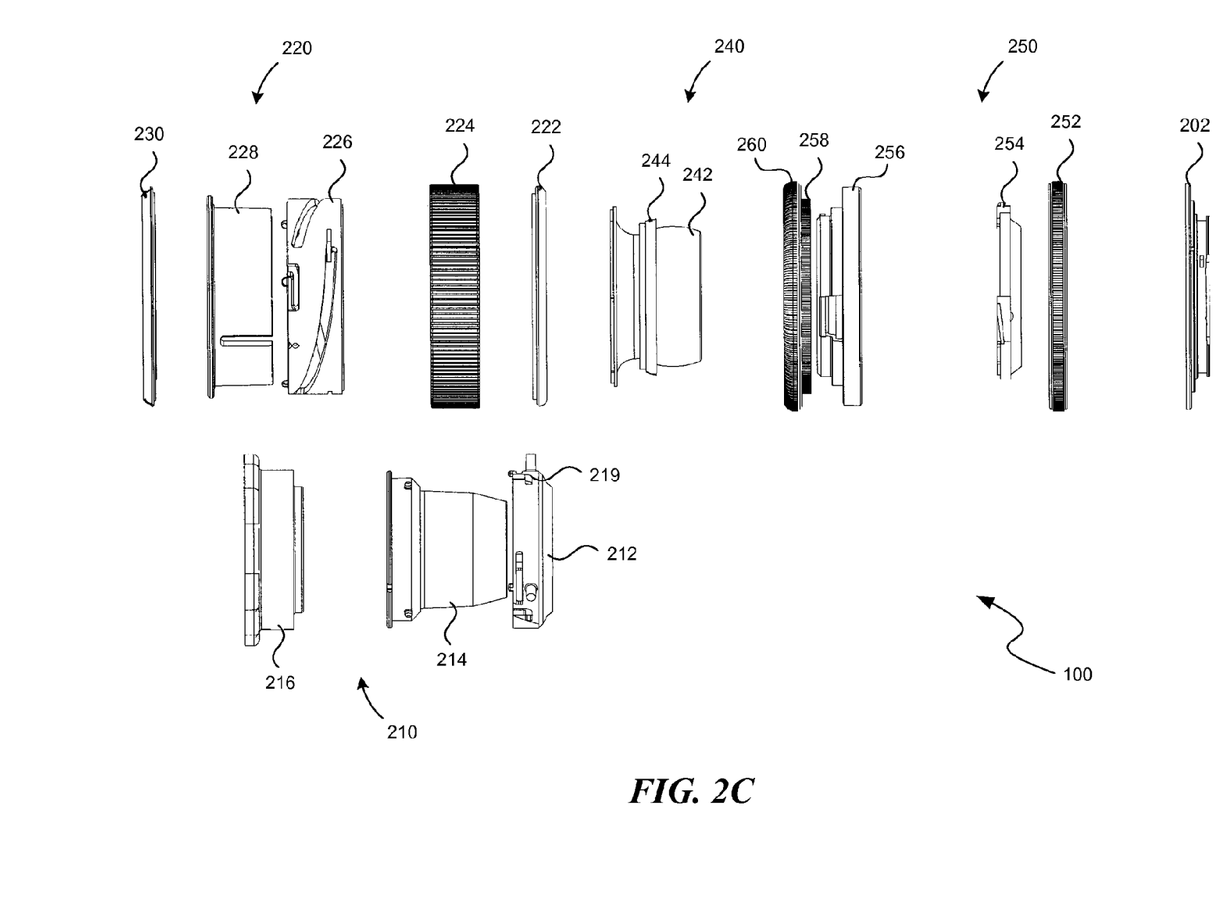
FIG. 2C is an exploded side view of a lens assembly configured in accordance with an embodiment of the disclosure.

FIG. 2A is an isometric exploded front view, FIG. 2B is an isometric exploded rear view, and FIG. 2C is an exploded side view of the lens assembly 100 configured in accordance with an embodiment of the disclosure. Referring to FIGS. 2A-2C together, the lens assembly 100 of the illustrated embodiment includes the following features in one embodiment: a camera mount 202 that locks onto an interchangeable lens camera, an adapter 212 with bayonet-type mounting system for an optical assembly 210, an optical cup 214 removably retained in the adapter, a front to back focus assembly 220 holding the adapter 212 (and optical assembly 210), a ball in socket tilt assembly 240, a tensioner assembly 250 to adjust the friction setting on the ball in socket tilt assembly 240, and metal compression springs to hold the lens securely when ball is held in its least tensioned state. Several of these assemblies and their respective components are further described below, without limiting the structure and/or features of these components and assemblies.

The mount 202 can be a rigid and durable plate with a bayonet-type or screw feature allowing secure and precise attachment to the front of a camera body. The mount 202 can therefore provide a precise alignment of the assembly 100 when it is held, tilted, focused and or/zoomed.

The ball in socket tilt assembly 240 includes a ball 242 and a race 244. In one embodiment, the race 244 can be made from a flexible material, such as a plastic. As such, the race 244 can be a flexible ring that surrounds the front portion of the ball 242 or captures the ball 242, and limits the ball 242 from moving generally out of the ball's ideal rotational axis within the assembly 240. The race 244 can be slipped over the ball 242 and is held in place by the clamp 256. For example, the flexible race 244 can have an inner diameter that is less than an outer diameter of the ball 242 so that the race 244 is at least partially retained on the ball 242. The ball 242 can be a partial sphere at the base of the assembly 240. The ball 242 can provide a rigid connection between the camera mount 202 and the focusing assembly 250.

The ball socket tilt assembly 240 allows a photographer the option of tilting the optical assembly 210 up to about 17 degrees (i.e., about 17 degrees in one direction, for a total of 34 degrees from one extreme to another) out of parallel with the image plane in any direction upon the axis of this ball 242 through manual manipulation of the front of the ball socket tilt assembly 240. Tilting the optical assembly 210 thus changes the positioning in the image of the sweet spot of focus and/or changing angle of the plane of focus as seen in the camera's single lens reflex viewfinder.

According to one embodiment, the ball socket tilt assembly 240 can also include a tilt limiter, such as an accessory ring snapped to or fitted around the throat in front of the spherical feature of the ball 242. The tilt limiter can be removable and limit the amount of tilt to something less than about 17 degrees in one direction for the purpose of keeping the lens inside of a range of tilt that the photographer desires. The tilt limiter can limit this movement by causing the clamp 256 and/or race 244 to contact the tilt limiter prior to tilting the lens to the point at which the full amount of tilt (e.g., about 17 degrees in one embodiment) would, without the limiter in place, be possible. In other embodiments, multiple tilt limiters may be used for different maximum tilt angle ranges.

The tensioner assembly 250 can include a knurl adapter 252, a base 254, a clamp 256, a tensioner ring 258, and a tensioner ring overmold 260. The base 254 can be a ring of generally rigid, self lubricating material surrounding the rear of the ball 242, to capture the ball 242 and tension the ball 242 forward into its ideal rotational axis. The tensioner ring 258 can be a plastic or rubber ring with internal threads which, when turned in one rotational/tilting direction by the user, engages its internal threads to the threads on the outside diameter of the base 254, and in so doing, increases the forward tension on the ball 242 by moving the base 254 closer to the race 244. The tensioner ring overmold 260 can be made of a plastic or rubber material that engages the tensioner ring 258. When the tensioner ring 258 is turned in the opposite rotational direction by the user, the tensioner ring 258 disengages its internal threads from the threads on the outside diameter of the base 254, and in so doing decreases the tension on the ball 242.

The clamp 256 is positioned at the center of the tilt mechanism holding the mount 204, race 244, base 254, springs, tensioner ring 258, and tensioner ring overmold 260 in precise alignment with the ball 242 so as to allow the user to grip the outside edge of the tensioner ring overmold 260 and turn in one rotational direction to increase the amount of force needed to rotate/tilt the ball 242 between the race 244 and the base 254, and likewise allow the user to grip the outside edge of the tensioner ring overmold 260 and turn in another direction to decrease the amount of force needed to rotate the ball 242 between the race and the base 254.

In one embodiment, the clamp 256 includes engageable arms with rounded ball ends extending from the clamp 256 to engage a channel or groove on the outside diameter of the ball 242 for the purpose of providing the photographer with a quick indication of when the ball is centered (e.g., no tilt), placing the optics in a parallel condition with the image plane. These fingers can be at the end of arms which will push inward when the tensioner (e.g., tensioner ring 258 and/or tensioner ring overmold 260) is rotated past an indentation beyond and in the same direction as the tensioner's loosest ball capture position. These rounded ball ends can extend inward and press on the ball 242 while remaining somewhat flexible such that when the rounded ball ends are pushed inward but are not inside of the channel groove the system will continue to rotate freely until the fingers fall into the groove and create additional resistance to the ball 242 being moved back into a tilted position.

In certain embodiments, the assembly 100 can also include compression springs that push the rear of the base 254 forward in the assembly 100 to keep a minimum tension on the ball 242 between the race 244 and the base 254 and to allow for consistent tension despite potential asymmetric aspects of the ball 242 that would, apart from the spring tension, cause the ball 242 to have more or less tension depending upon the tilt of the ball 242 in what, without the springs, would be a rigid system.

The focus assembly 220 can include a rear focus ring 222, a focus sleeve 224, a slotted focus ring 226, a collar 228, and a front focus ring 230. The rear focus ring can be adjacent to the ball 242 where it meets the back of the collar 228, which serves as a precision bearing surface for the back of the slotted focus ring 226 to rotate against. The rear focus ring 222 can also be combined with the front portion of the ball 242 or separate from the ball 242 for the sake of a employing a more precise bearing surface and for providing a high quality look and feel to the assembly. The slotted focus ring 226 is a front to back focus mechanism engaged with the adapter 212, which holds in place the interchangeable optical assembly 210 and allows the optics to be adjusted in a front to back manner in the direction of the tilt of the optics assembly 210 in relation to the imaging surface.

The slotted focus ring 226 includes a slot having a variable angle (e.g., a variable radius of curvature) that allows for more gradual focus adjustments as the lens focuses on subject matter closer to infinity, while more rapid adjustments to be made when the lens focuses on subject matter which is closest to the camera. The focus sleeve 224 provides grip and backbone for the slotted focus ring 226. For example, the focus sleeve 224 can provide a rigid and tactile area where the user turns the outside rubberized surface of the focus sleeve 226 which internally grips the slotted focus ring 226 and provides the slotted focus ring 226, which on its own is quite limber and flexible, with a rigid backing thereby providing a precise and secure adjustable track for the adapter 212 which holds in place the interchangeable optical assembly 210.

The collar 228 can be a foundation for the focus mechanism and provide a straight front to back track that maintains the alignment of the optical assembly 210 while connecting the ball 242 to the front capture of the slotted focus ring 226, focus sleeve 224, and adapter 212. The front focus ring 230 can be an extension of the collar 228 where it meets the front of the focus sleeve 224 thereby allowing a precise and durable surface to serve as the faceplate of the optical assembly 210.

In one embodiment, the optical assembly 210 includes the adapter 212 and an optical cup 214. The adapter 212 facilitates the interchangeable optical assemblies and travels forward and backward inside the collar 228 when the focus sleeve 224 is turned by the user rotating the slotted focus ring 226 which couples with three pins of the adapter 212. The optical cup 214 has a housing 215 that carries an optic 217. The optical cup 214 removably attaches to the adapter 212 (as discussed in greater detail below) that securely holds the optical cup and associated optic in proper position within the lens assembly 100. In one embodiment, the adapter 212 integrates a bayonet-type system including three L shaped internal cutouts in the adapter 212 and three spring loaded raised bumps that couple with three tabs and one to three recesses or channels 219 in the interchangeable optical assembly housing. The adapter 212, along with the necessary interface on the interchangeable optical assemblies, allows for secure mounting and simple swapping of optical assemblies.

Figure 3:
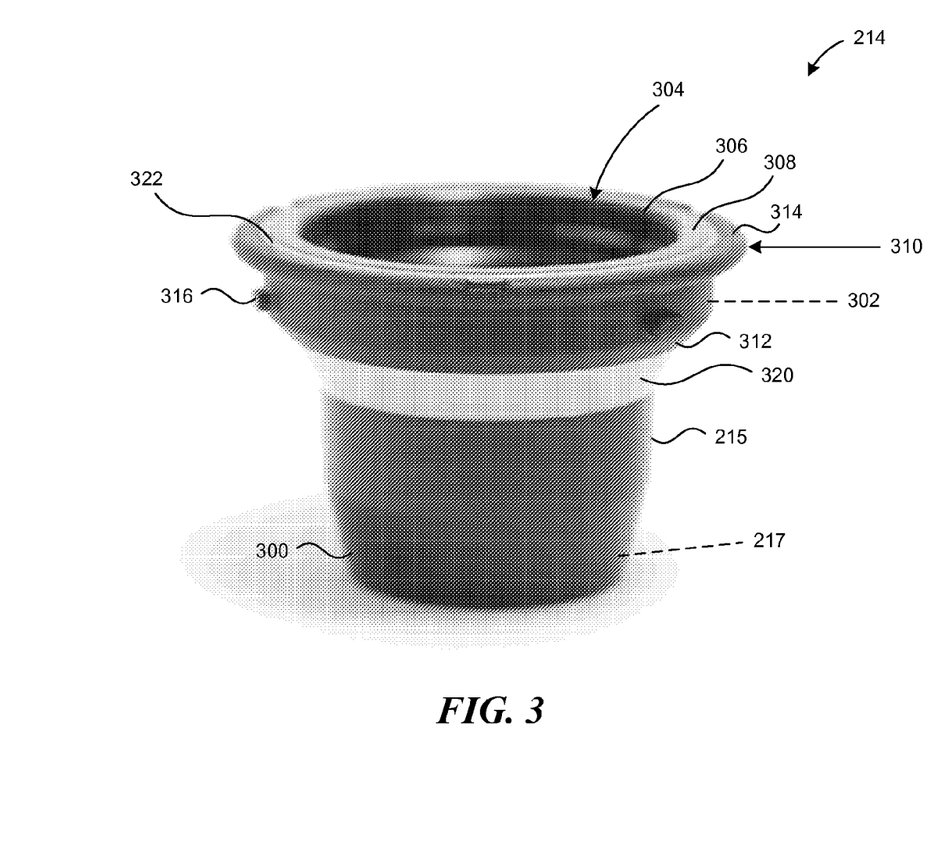
FIG. 3 is a side view of an optical cup in accordance with an embodiment of the present invention.
Figure 4:
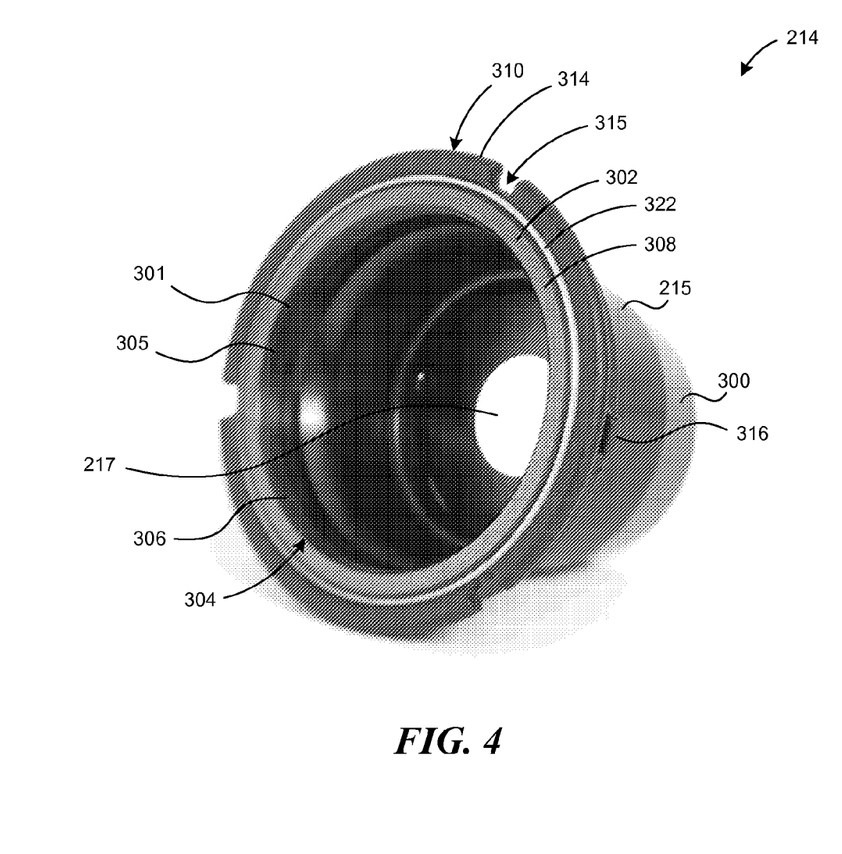
FIG. 4 is a top end view of the optical cup of FIG. 3

FIG. 3 is a side view of an optical cup 214 in accordance with an embodiment of the present invention, and FIG. 4 is a top end view of the optical cup of FIG. 3. The optical cup 214 has the housing 215 with a narrowed bottom portion 300 and an open top portion 302. The optic 217 of the illustrated embodiment is carried in the housing's bottom portion 300 and in axial alignment with the housing 215. In one embodiment an optic ring 301 is positioned within the housing 215 adjacent to the optic 217 so as to fixedly hold the optic in the housing. The optic ring 301 of the illustrated embodiment is securely connected to the housing by a pressure or friction fit, although other techniques could be used to hold the optic ring in place. In the illustrated embodiment, the housing 215 and the optic ring 301 are configured to receive and removably retain an aperture disc next to the optic. In the embodiment of FIG. 4, the optic ring 301 includes one or more magnets 305 positioned to engage and hold the aperture disc in place once installed. In other embodiments, other holding techniques can be used to removably retain an aperture disc on the optic ring 301 next to the optic 217.

The housing's open top portion 302 has a threaded inner surface 304 with threads 306 adjacent to a top edge 308 of the housing 215. The open top portion 302 of the housing is configured to removably receive any of a plurality of filters that screw onto the threads 306 and extend across the open top portion in axial alignment with the optic 217. While the illustrated embodiment has threads 306 on the housing to removably receive a filter, other attachment mechanisms or systems can be used to attach a filter to the optical cup in alignment with the optic 217.

It is noted that the terms "top" and "bottom" are used in conjunction with the view of the optical cup for purposes of providing a frame of reference for purposes of discussion. It is to be understood that, in use, a "top" structure could be above, below, left, right, or a combination of these directional terms (relative to vertical) of a "bottom" structure depending upon the orientation of the optical cup or lens assembly relative to vertical.

Figure 7:
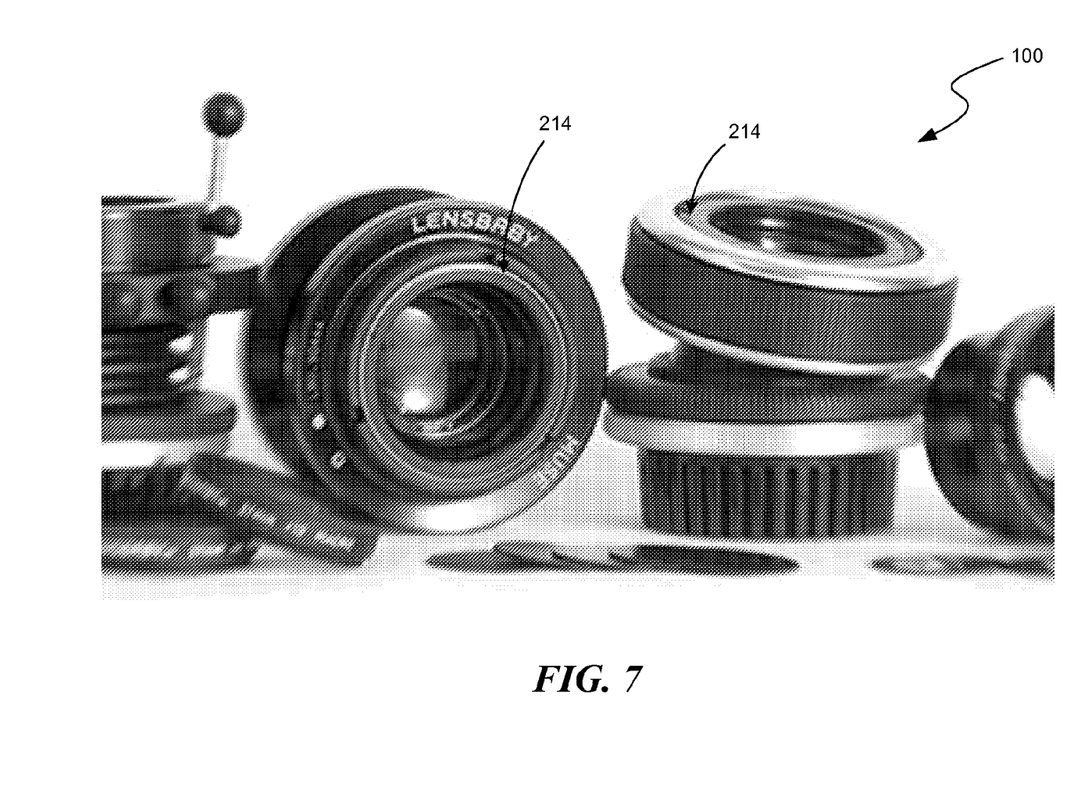
FIG. 7 is a view of lens assemblies with optical cups installed therein in accordance with an embodiment of the invention.

The optical cup 214 has an engagement ring 310 with a beveled or tapered lower potion 312 and a top radial flange 314 that is substantially coplanar with the top edge 308 of the housing 215. The radial flange 314 of the illustrated embodiment has one or more cutouts 315 configured to receive protrusions on a spanner 216 (FIG. 2A) or other tool used install or remove the optical cup from the adapter 212 of the optical assembly 210. The engagement ring 310 of the illustrated embodiment also has radially projecting tabs 316 intermediate the beveled lower portion 312 and the top radial flange 314. The tabs 316 are shaped and sized to slide along the tracks or channels 219 in the adapter 212 (FIG. 2) and to releasably retain the optical cup 214 in an installed position in the lens assembly 100 (as shown in FIG. 7).

The optical cup 214 of the illustrated embodiment has a lower retaining ring 320 positioned between the outer surface of the housing 215 and the beveled lower portion 312 of the engagement ring 310. The lower retaining ring 320 in one embodiment is sized to extend below the engagement ring 310 so the lower retaining ring is visible. The optical cup 214 of the illustrated embodiment also has an upper retaining ring positioned between the open top portion 302 of the housing and the top radial flange 314 of the engagement ring 310. In one embodiment, a portion of the upper retaining ring 322 is also visible to a person looking at the open top portion 302 of the housing when the optical cup 214 is installed. The upper and lower retaining rings assist in retaining the engagement ring 310 in a fixed position on the housing 215.

Different optical cups 214 can be provided with different optics 217. For example, the optical cup can include any one of a plastic element, single glass element, double glass element, fish-eye, wide angle, or any other selected lens element or grouping of lens elements that focuses light to create an image on film or an imaging plane. One optical cup can include a first type of an optic, and other optical cups (interchangeable with any of the other optical cups) can include different optics. Accordingly, a user can easily and quickly change optical cups 214, such as if the user wants to take pictures using different techniques.

Figure 5A:
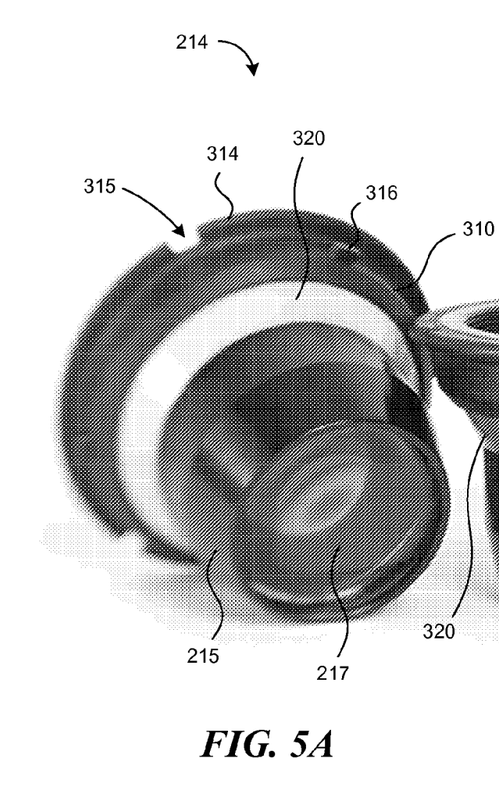
FIGS. 5A-C are top, side, and bottom views of different optical cups with different colored retaining rings
Figures 5B, 5C:
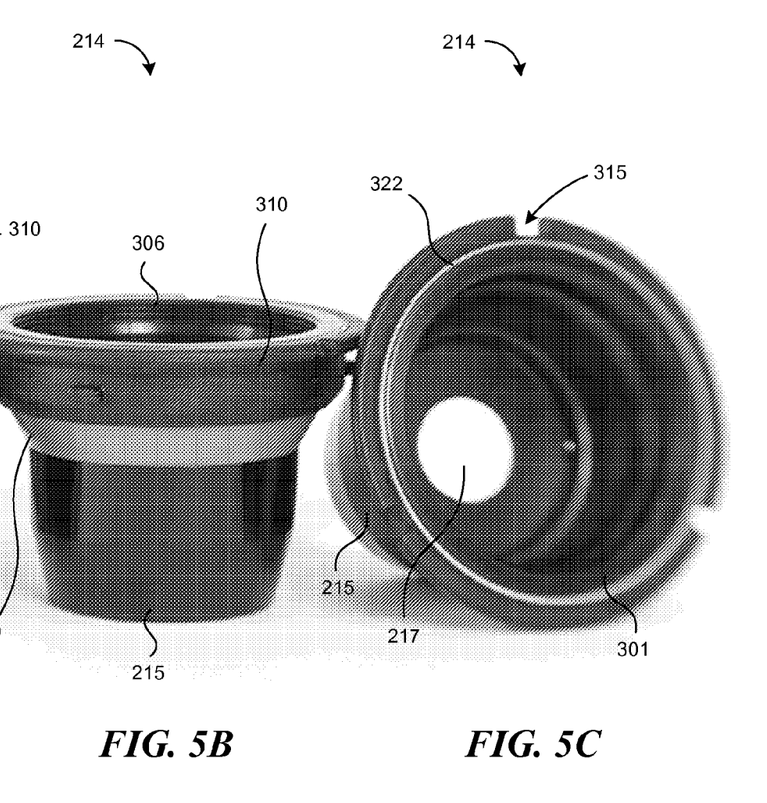

FIGS. 5A-C are top, side, and bottom views of different optical cups 214 that contain different optics 217 (i.e., the optics have different optical characteristics). In the illustrated embodiment, the optical cups 214 are color coded by providing upper and/or lower retaining rings 320 and 322 of a selected color used to signify the characteristic of the optic in that optical cup. Accordingly, a user will know (or learn) that an optical cup with yellow upper and/or lower retaining rings has one type of optic, and an optical cup having a different colored upper and/or lower retaining rings (e.g., blue, pink, black, white, etc.) will have an optic with a different characteristic. This color coding of the optical cups allows a user to easily identify and select which optical cup he or she desires to obtain photographs using a desired photographic technique. While the illustrated embodiment has the color coded optical cups 214, other embodiments need not include the color coding. In one embodiment, indicia, such as text, symbols, etc., can be provided on the exterior of the optical cup 214, wherein the indicia provides a visual indication of the type of optic is in the optical cup. The indicia can be color coded or not.

Figure 6:
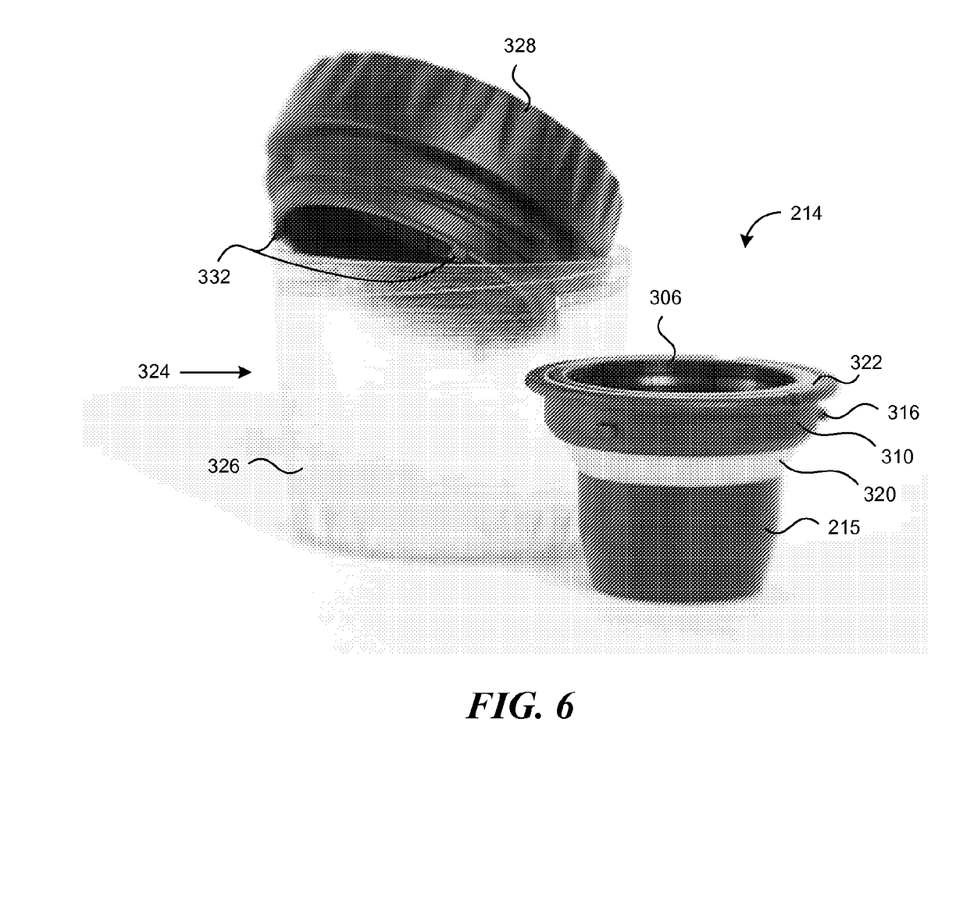
FIG. 6 is a side view of the optical cup of FIG. 3 adjacent to a carrying assembly.

FIG. 6 is a side view of the optical cup 214 of FIG. 3 adjacent to a carrying assembly 324. The carrying assembly has a clear container portion 326 configured to allow a user to see an optical cup 214 contained therein. In the embodiment wherein the optical cups 214 are color coded, a user can see through the container portion 326 and easily determine which type of optical cup is in the carrying assembly.

In the illustrated embodiment, the carrying assembly 324 has a top portion 328 separable from the container portion 326. In the illustrated embodiment, the top portion 328 of the carrying assembly 324 (show in FIG. 6 askew from the container portion) is configured with an integral tool 332 that can act as an optical cup release to install or remove the optical cup 214 from the adapter 212 (FIG. 2). The illustrated tool 332 is a spanner with a plurality of radially disposed tabs that fit into slots formed in the top radial flange 314 of the engagement ring 310. Accordingly, a user can the use the tool 332 to engage and rotate the optical cup 214 to release or engage the optical cup with the adapter 212 (FIG. 2). In other embodiments, other tools separate from the carrying assembly 324 can used to interchange optical assemblies. Alternatively, the optical cup can be configured for removal or installation without using a tool (i.e., tool-less installation or removal).

FIG. 7 is a view of lens assemblies with optical cups installed therein in accordance with an embodiment of the invention. The optical cups 214 of the illustrated embodiment can have a common size so as to be useable in the tilt assembly 240 and in other lens assemblies (tiltable or non-tiltable).

The embodiments described above provide several novel features. For example, the illustrated assembly 100 provides interchangeable optical assemblies. The interchangeable optical assemblies can include a quick release of an optical assembly from the body of a tilt/focus mechanism, while the focusing mechanism stays with the main body of the assembly. Because the optical cup is removable and interchangeable, the focus and tilt mechanism can remain with the camera while the lens and aperture can be separated and interchangeable. This differs from existing tilt systems with interchangeable optical assemblies that contain a focus mechanism housed within each interchangeable optical assembly.

The embodiments disclosed herein also provide for a variable angle of slots in the slotted focus sleeve. For example, the radius of curvature in the slot of the focus sleeve can change (e.g., the radius of curvature can be larger or smaller) at the end portions and/or middle portions of the slot. The variable angled slots allow for more precision focusing closer to infinity. In contrast, precise manual focus in existing focus mechanisms is compromised by focus adjustments that are overly coarse when focusing on distant subjects, and overly precise when focusing on up-close subjects The embodiments disclosed herein also provide for a fluidly adjustable ball in socket tilt mechanism allowing up to about 17 degrees in one direction (i.e., for a total of about 34 degrees of tilt from one extreme to another) of total tilt off parallel of the lens elements.

The embodiments disclosed herein also include a tension adjustment providing the ability to lock the tilt mechanism down completely.

The embodiments disclosed herein further provide a minimum tension on lock and tilt mechanism controlled by the use of compression springs holding the ball with consistent tension independent of imperfections in the symmetry of the ball's outer surface.

In operation, the tensioning assembly is rotated to put the ball in its least tensioned position in order to allow for easy manual adjustments of the ball socket tilt assembly. In order to achieve a certain desired effect, the ball can be pushed from one side or another side to bring the lens elements into a parallel state with the image plane or to move the lens elements off parallel with the camera's image plane in the amount desired by the user. The focus sleeve can also be turned to bring the desired portion of the image into sharp focus, and once the image has been focused and the user has decided that the tilt is correct for the shooting situation the user may choose to rotate the tensioner in order to put the ball in its most tensioned position so as to protect the lens from being inadvertently moved from this ideal position.

If the user so chooses, the interchangeable optical assembly may be removed by the user and a new optical assembly may be put in its place to achieve a look and feel that is unique to the new interchangeable lens assembly. Pictures may be taken throughout this process to determine proper focus, exposure, etc.

We claim:

1. A lens assembly useable with a camera having a camera body, the lens assembly comprising:
   a lens body adapted to couple to the camera body, the lens body including a tilt assembly portion configured to allow pivotal movement of the lens body relative to the camera body; and
   a focus assembly coupled to the lens body and configured to axially adjust a position of a removable optic assembly mounted to the focus assembly relative to the lens body to control focus of the lens assembly when the optic assembly is installed in the lens body, wherein the lens body and focus assembly are structured to remain coupled to the camera body after the optic assembly is removed from the focus assembly.

2. The lens assembly usable with a camera having a camera body according to claim 1, in which the optic assembly is removably mounted to the focus assembly through an adaptor, and in which the optic assembly comprises:
   a housing connectable to the adapter; and
   an optic carried by the housing.

3. The lens assembly of claim 2 wherein the adapter is a bayonet mounting system configured to move axially with the optic assembly relative to lens body upon adjustment of the focus assembly.

4. The lens assembly of claim 2 wherein the housing of the optic assembly includes a color coded portion, wherein a color of the color coded portion corresponds to an optical characteristic of the optic in the optic assembly.

5. The lens assembly of claim 4 wherein the optic assembly is a first optic assembly with a first optic and the color coded portion is a first color, and further comprising a second optic assembly with a second optic having a second optic different than the first optic, and a second color coded portion that is a second color different than the first color.

6. The lens assembly of claim 1 wherein the optic assembly includes an optic ring fixedly holding the optic within the housing.

7. The lens assembly of claim 1 wherein the housing of the optic assembly includes an optic cup that carries the optic and is coupled at an end portion to the adapter.

8. The lens assembly of claim 1 wherein the lens body portion is structured to removably couple to a camera mount that is mountable on the camera body.

9. The lens assembly of claim 1 wherein the focus assembly is a front to back focus assembly holding the adapter and carrying the optic assembly.

10. The lens assembly of claim 1 wherein the tilt assembly is a ball-in-socket tilt assembly comprising a partially spherical ball portion pivotally engaged with a race forming a socket portion.

11. The lens assembly of claim 10 wherein the tilt assembly is configured to allow the lens body to tilt relative to the camera body through an angular range of motion of approximately 34 degrees.

* * * * *